Feb. 7, 1928.

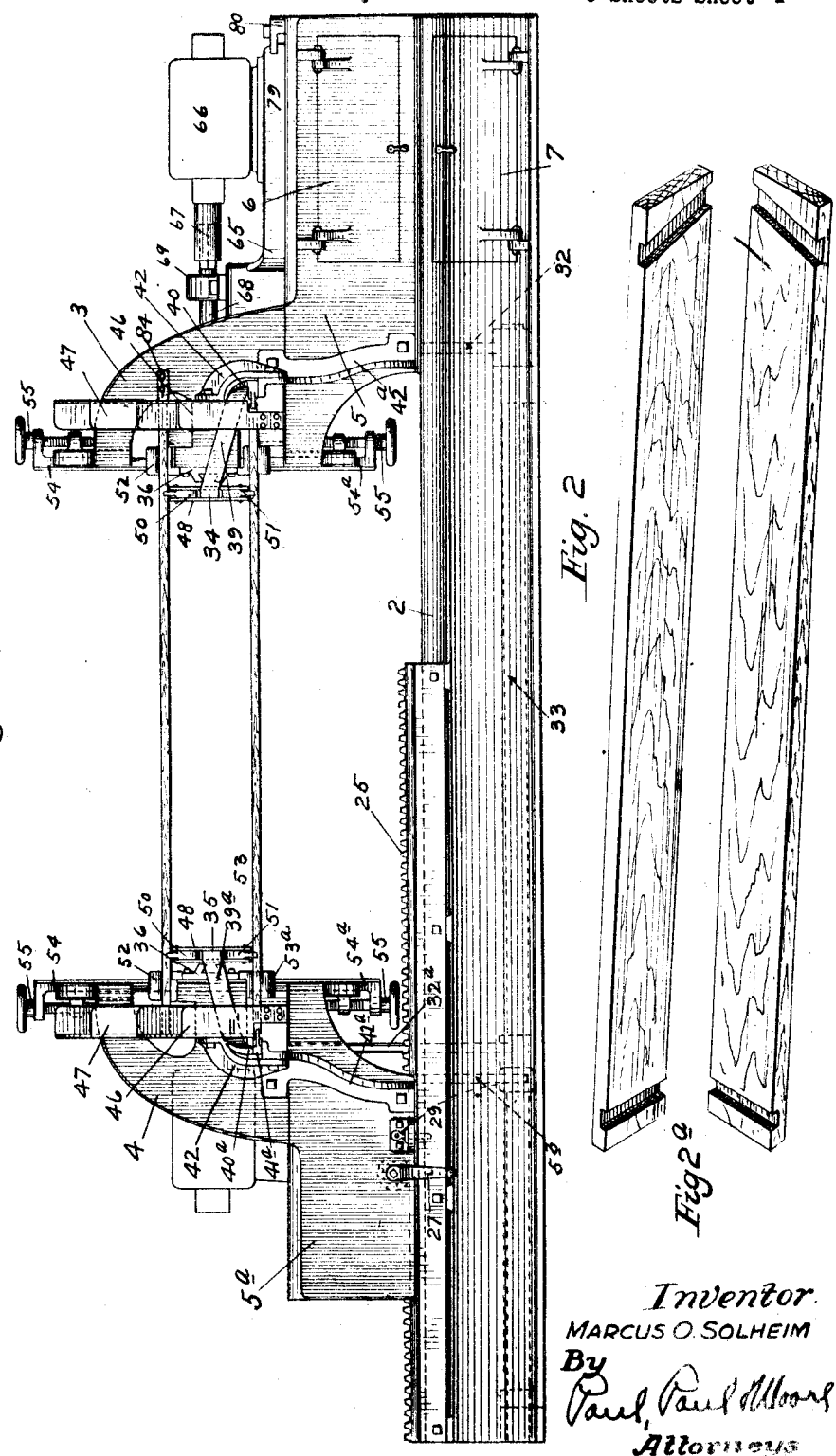

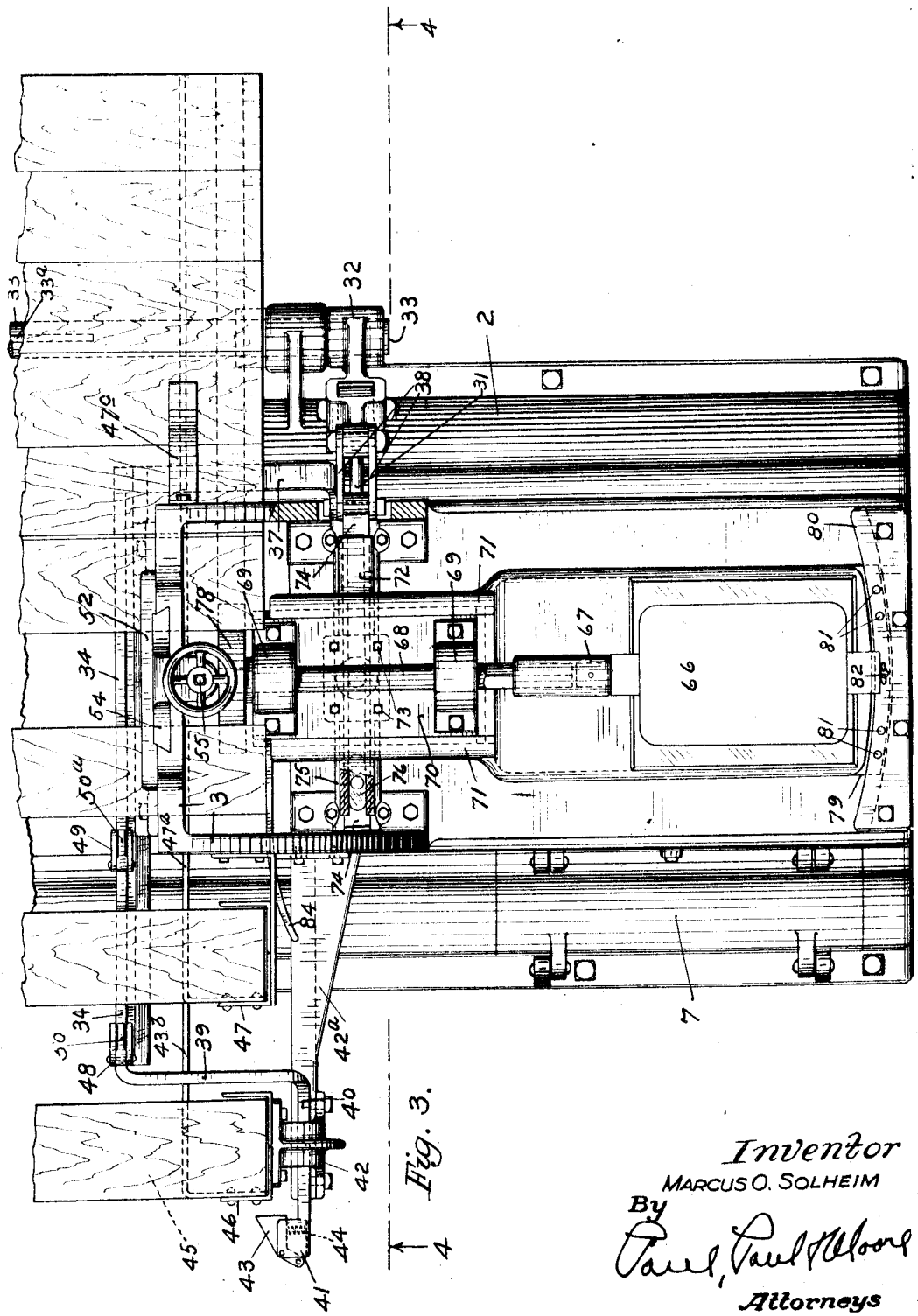

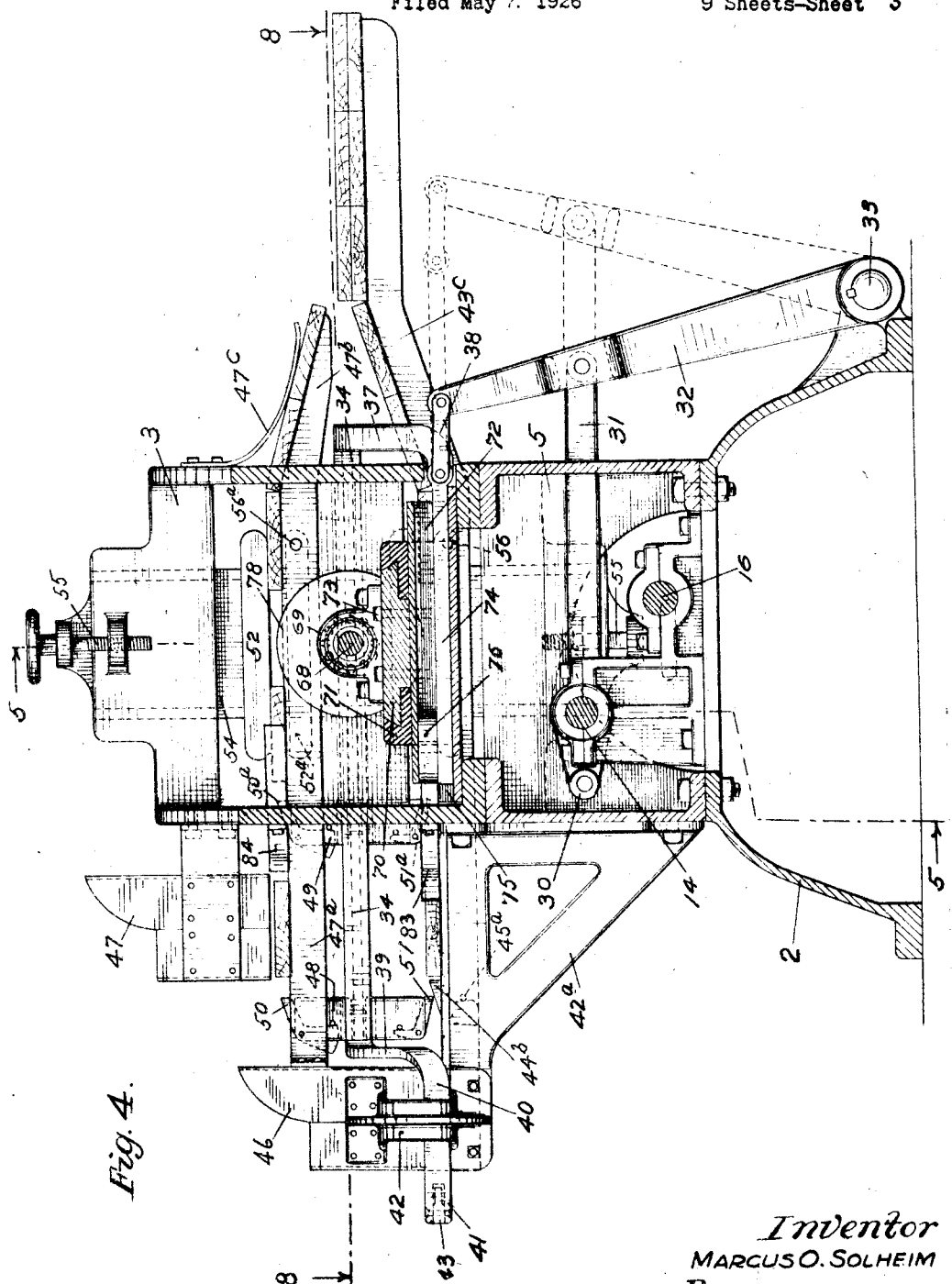

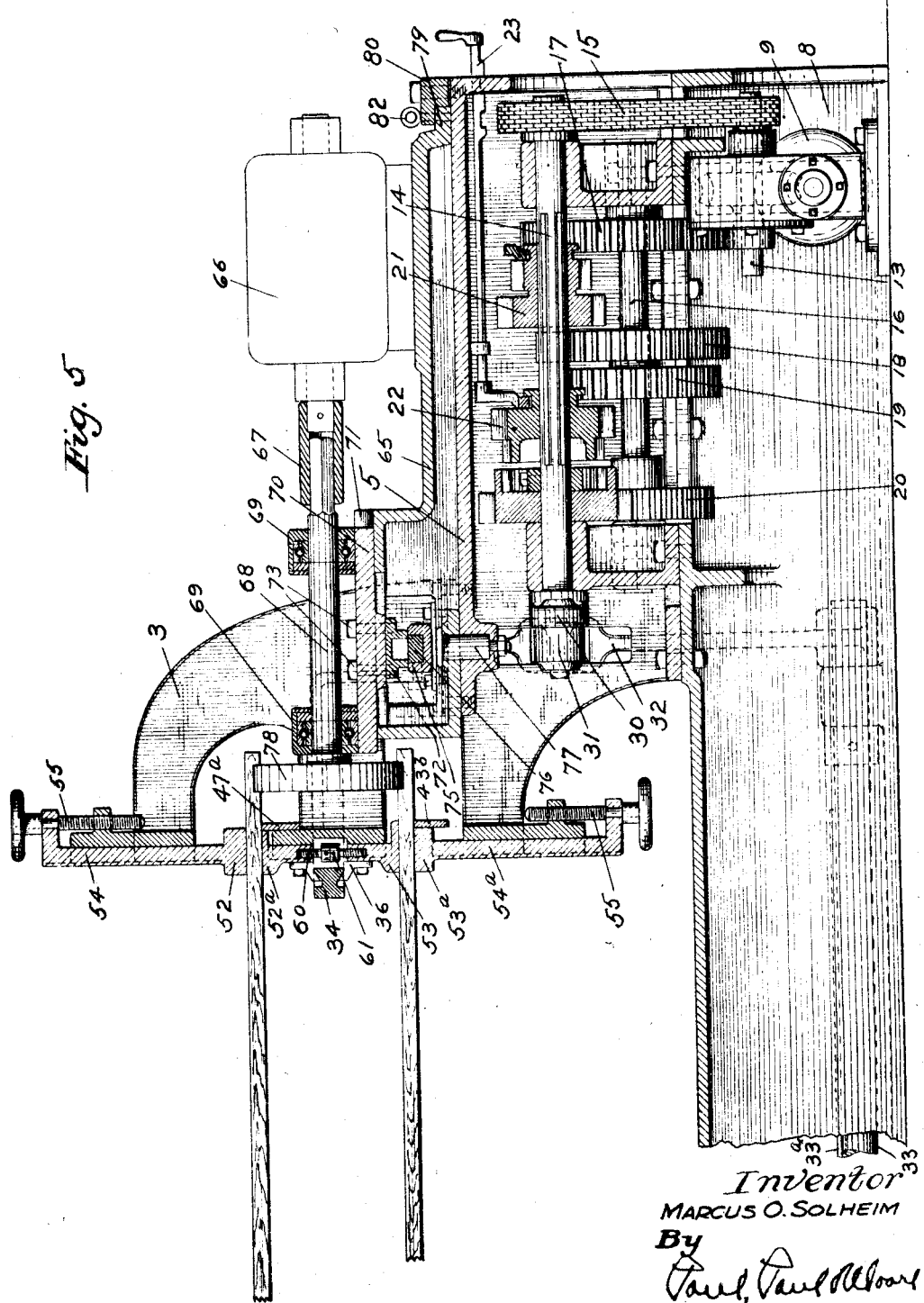

M. O. SOLHEIM 1,658,260

DADOING MACHINE

Filed May 7. 1926   9 Sheets-Sheet 5

Inventor
MARCUS O. SOLHEIM
By
Paul, Paul Moore
Attorneys

Feb. 7, 1928.

M. O. SOLHEIM 1,658,260

DADOING MACHINE

Filed May 7, 1926

Inventor
MARCUS O. SOLHEIM
By

Feb. 7, 1928.
M. O. SOLHEIM
1,658,260
DADOING MACHINE
Filed May 7, 1926     9 Sheets-Sheet 9
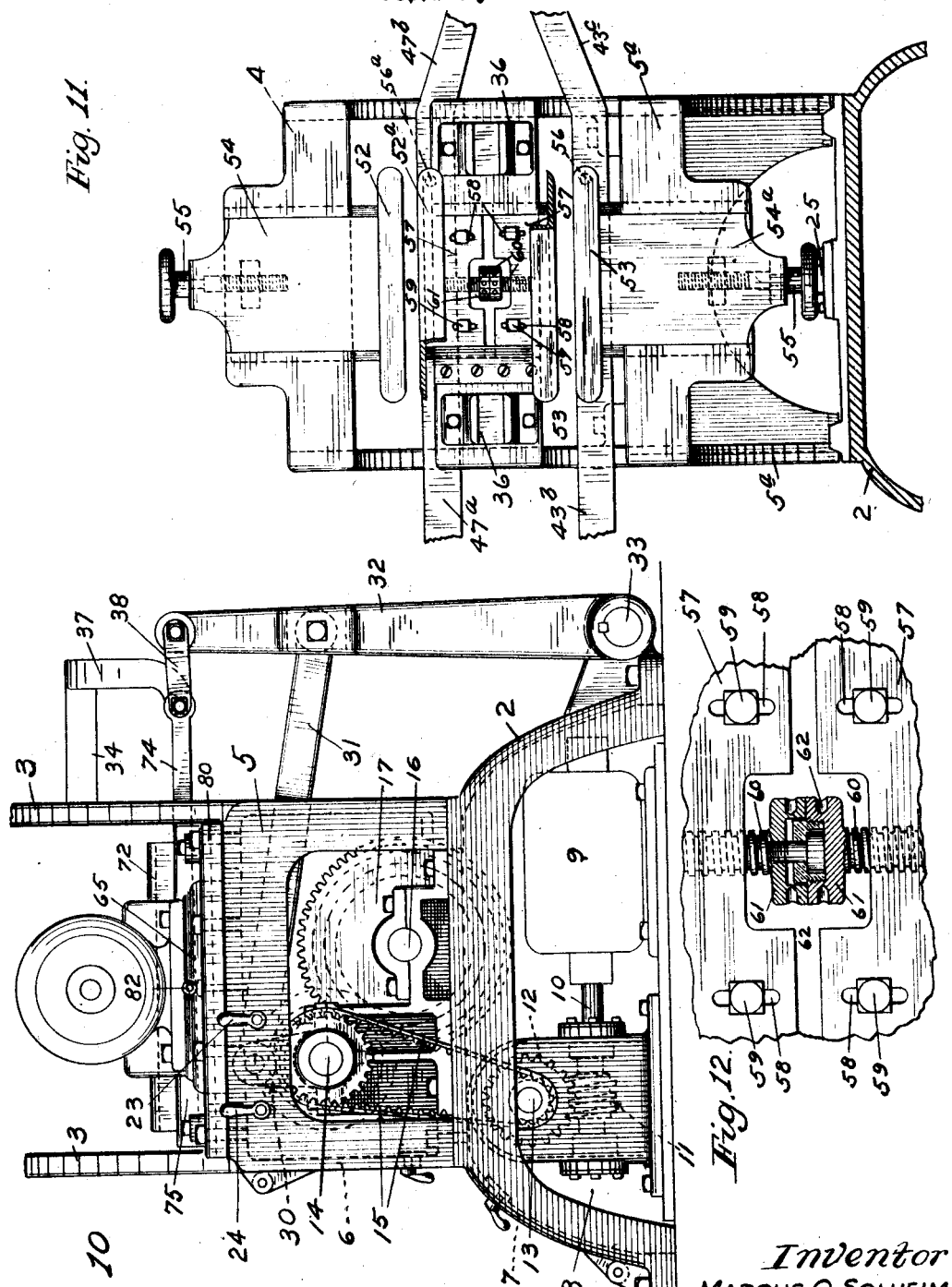
Inventor
MARCUS O. SOLHEIM
By
Attorneys Patented Feb. 7, 1928.

1,658,260

UNITED STATES PATENT OFFICE.

MARCUS O. SOLHEIM, OF BAYPORT, MINNESOTA, ASSIGNOR TO ANDERSON LUMBER COMPANY, OF BAYPORT, MINNESOTA, A CORPORATION OF WISCONSIN.

DADOING MACHINE.

Application filed May 7, 1926. Serial No. 107,414.

My invention relates to machines for dadoing window and door jambs and the primary object of the invention is to reduce the cost of labor incidental to the formation of dadoes in window and door jambs and at the same time increase production.

A further object is to provide means whereby the dadoes for the jambs of both sides of the window or door frame, or rights and lefts, may be cut or formed simultaneously, thereby avoiding possible inaccuracies which may arise when the dadoes of the opposite jambs are cut by successive operations nstead of simultaneously.

A further object is to provide a jamb feeding and dado-cutting mechanism which will llow the depth of the dado to be determined or gauged from the face of the jamb istead of the back, thereby avoiding any naccuracies which will frequently arise hen the depth of the dado is limited by he thickness of the stock.

Other objects of the invention will appear from the following detailed description.

The invention consists generally in varius constructions and combinations, all as ereinafter described, and as particularly ointed out in the claims.

In the accompanying drawings forming part of this specification,

Figure 1 is a side elevation of a dadoing machine embodying my invention;

Figures 2 and 2ª are perspective views of a pair of jambs showing the position of the dado cuts therein;

Figure 3 is a plan view of one end of the machine showing the position of the cutter for making a straight cut across the jamb;

Figure 4 is a vertical cross section on the line 4—4 of Figure 3;

Figure 5 is a vertical longitudinal section on the line 5—5 of Figure 4;

Figure 10 is an end view of the right hand end of the machine showing the mechanism for operating the feed device and speed changing mechanism;

Figure 11 is a view showing the means for adjusting the clamping heads between which the jambs are fed; and Figure 12 is a detailed sectional view showing the means for independent adjustment of the inner clamping heads and the operating screws therefor.

Figure 6:
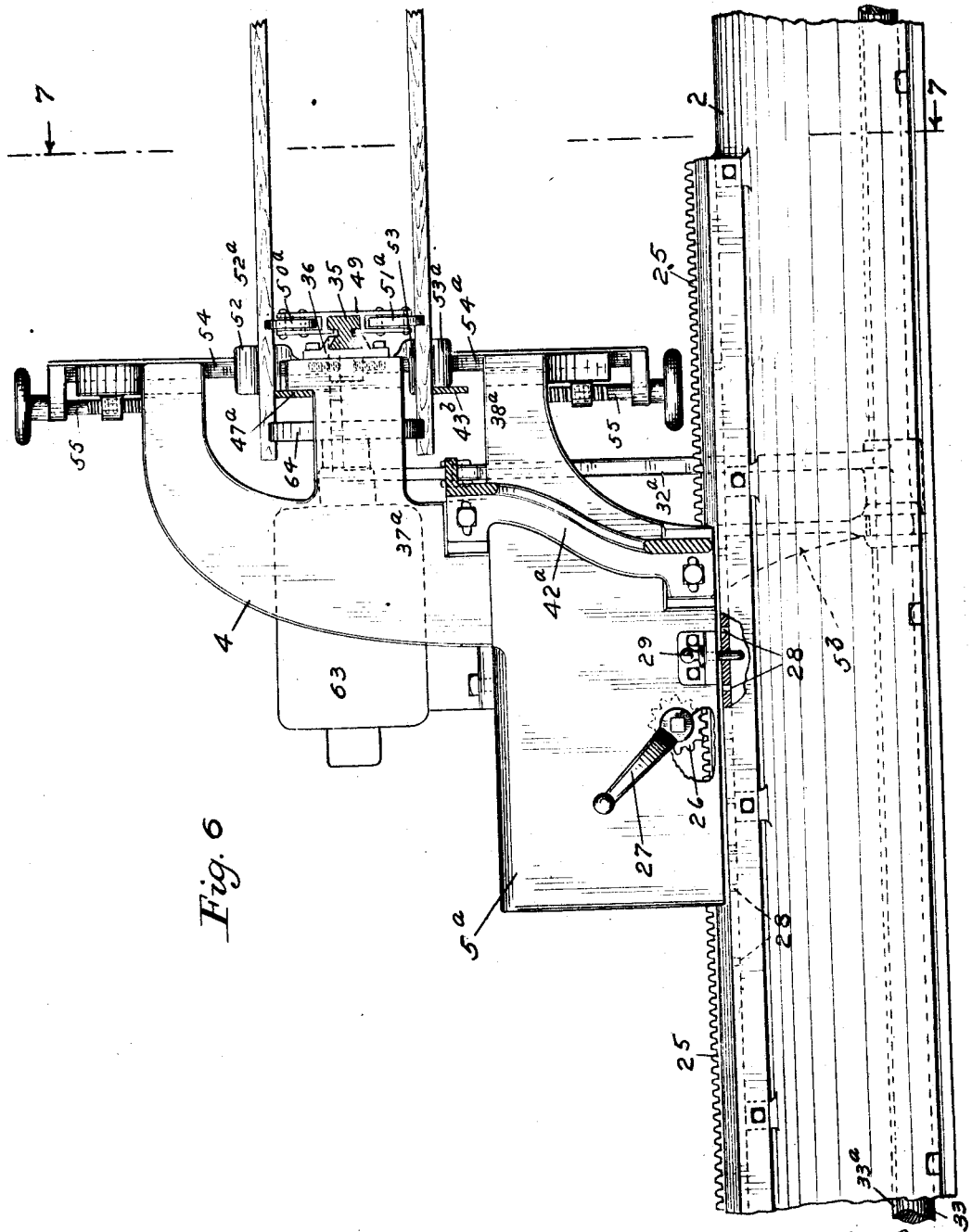
Figure 6 is a side elevation of the left hand end of the machine showing the means for adjusting the bracket or standard to adapt the machine for varying lengths of jambs.

In the drawing 2 represents the bed of the machine and 3 and 4, housings mounted thereon. These housings have suitable bases 5 and 5ª and a door 6 leads to the chamber in the housing 5, and below this door is a similar door 7 through which access may be had to a chamber 8 in the end of the bed.

In this chamber 8 a motor 9 is mounted, preferably of the electric type, and connected with a source of electrical supply by suitable means not shown. This motor has a shaft 10 provided with a worm 11 which meshes with a worm gear 12 on a shaft 13. A shaft 14 is mounted horizontally in suitable bearings in the base of the housing 3 and extends parallel substantially with the base and above the same and has a driving connection through a belt 15 with the shaft 13, whereby power of the motor is transmitted to the shaft 14. A shaft 16 is mounted in bearings in the base 5 and is provided with gears 17, 18, 19 and 20, and on the shaft 14 sliding clutch gears 21 and 22 are splined and adapted for engagement with the gears on the shaft 16 for varying the speed of the feed mechanism and the movement of the jambs through the machine depending upon the width of the stock and depth of the cut of the dadoes. The clutch gears 21 and 22 are controlled by shifters 23 and 24, the operator being able by means of the shifters to easily and quickly set the feed mechanism for the desired feeding speed. At the opposite end of the machine bed the base 5ª and the housing 4 are mounted to slide on the bed and are conveniently adjustable thereon by means of a rack 25, engaging the teeth of a pinion 26 that is revolved by means of a suitable crank 27. The base has holes 28 at intervals therein and a pin 29 adapted to enter these holes and lock the housing in its adjusted position. The purpose of this adjustment is to vary the distance between the housings and thereby adapt the machine for window and door jambs of different lengths. The operator or attendant is thus able by manipulation of the crank 27 to move the base 5ª and housing 4 forward or backward on the bed 2 and readily adapt the machine for different lengths of stock.

The feeding mechanism.

The shaft 14 is provided with a crank 30 pivotally connected by a rod 31 with a lever 32 that is mounted in an upright position on a horizontal rock shaft 33 that is positioned near the base of the machine. A similar lever 32ª is mounted on the shaft 33 at the outer end of the machine. When the shaft 14 is revolved the levers 32 and 32ª will be rocked back and forth and through this movement the door or window jambs will be fed to the machine in the manner which I will now proceed to describe in detail.

Bars 34 and 35 are movable horizontally in guides 36 in the opposite housings 3 and 4 and arms 37 and 37ª and links 38 and 38ª connect these bars respectively with the upper ends of the levers 32 and 32ª so that when the levers are rocked back and forth the bars 34 and 35 will be reciprocated longitudinally. Bar 34 has a right-angled downwardly extended portion 39 which is provided with a forwardly extended portion 40. a bifurcated head 41 in which is mounted a dog 43 pressed outwardly by a spring 44 in position to engage a jamb 45 in the bottom of a hopper wherein the jambs are placed vertically, one above another. On the other side of the machine is the bar 35 corresponding to bar 34 and having the same parts. I will designate corresponding parts with the same reference numerals with the addition of the exponent "a." When these bars 34 and 35 are moved to the right by the operation of the oscillating levers the dogs 43 and 43ª will engage the lower jamb in the outer or lower hopper and push it out under the feed stroke toward the cutting heads.

On the opposite side of the machine from the levers, hoppers 46 and 47 are supported by brackets 42 and 42ª and so mounted between the end portions 40 and 40ª of the bars 34 and 35 as to contain a pile of jambs placed one above the other therein. The end portions 40 and 40ª slide on the brackets 42ª. The lower jamb of the pile rests upon supporting rails 43ᵇ and is adapted to slide thereon in the feeding operation of the machine. The dogs 43 and 43ª are so positioned that they will engage the lower jamb 45 of the pile and push it out from beneath the other jambs. Dogs 44ᵇ are pivoted on the rails 43ᵇ and contact with pins 45ᵇ which limit movement of the dogs and cause them to stand in the position shown in Figure 7 with one end projecting above the top of the rails to prevent backward movement of each jamb that has passed thereover, the dogs having freedom of tilting on their pivots to allow feed of the jambs. A second hopper 47 is provided above the level of the hopper 46 and also adapted to contain a pile of jambs placed one above the other therein and one end of each hopper is connected with the movable housing 4 by suitable means so that when the housing is adjusted on the machine base to adapt the machine for different lengths of jambs, the hoppers will be correspondingly adjusted to adapt them for receiving the different lengths of jambs piled therein. The base 5ª is provided with a depending arm 5ᵇ which engages the rock arm 32ª and slides it along on the shaft 33 and its key 33ª when the machine is adjusted for different lengths of jambs. Rails 47ª form the bottom of the hopper 47 arranged above and in parallel relation with the supporting rails 43ᵇ and on these rails 47ª the lower jamb of the pile in the hopper 47 will be moved into the machine. Feed heads 48 and 49 are mounted in an upright position on the bars 34 and 35 and provided with gravity dogs 50 and 51 and 50ª and 51ª adapted to engage the upper and lower jambs and push them forwardly on the rails 43ᵇ and 47ª into the machine.

Figure 7:
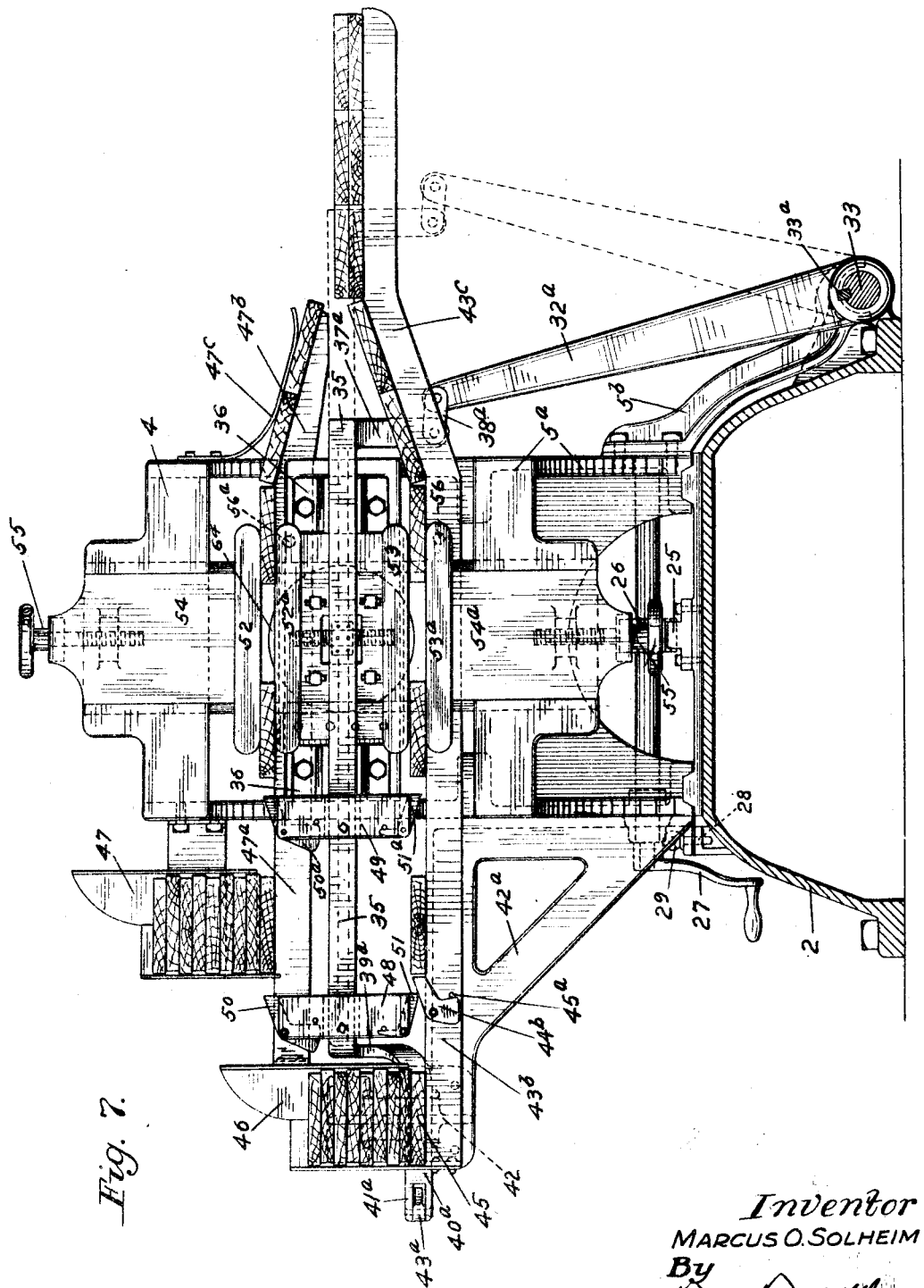
Figure 7 is a vertical cross section taken on the line 7—7 of Figure 6 showing the relative position of the hoppers and the feeding means therefor.

Referring to Figure 7 of the drawing. a jamb is shown discharged from the lower hopper and lying on the rails 43ᵇ beneath the jambs in the upper hopper. The initial movement of the feed heads 48 will push the lower jamb out of the hopper 46 and at the same time engage and feed the jamb lying on the rails 43ᵇ. The jambs will be carried forward toward the cutting heads with the stroke of the bars 34 and 35 in one direction and on the return stroke, the dogs 50ª and 51ª will slide over the jambs partly fed into the machine, to complete the feed on the next stroke of the bars. Thus the feed of the jambs will be continuous and in pairs or a complete set for each window and door frame.

In beginning the operation of the machine. the attendant will place a jamb on the rails 43ᵇ directly beneath those in the hopper 47 to insure the feeding in pairs of the jambs and upon the initial movement of the pair of jambs into the machine. the bottom jamb in the hopper 46 will be moved out to a position on the rails 43ᵇ beneath the jambs in the hopper 47, taking the place of the jamb that has been put on the rails 43ᵇ by hand preparatory to starting the machine. From this point. the feed of the jambs will be automatic and continuous and in pairs or rights and lefts, or a complete set for each window and door frame.

To hold the jambs in place during the dadoing or groove-cutting operation, I provide pairs of adjustable jaws designated by the reference numerals 52, 52ª, 53 and 53ª. The upper jaws 52 are mounted upon slides vertically movable in the housings 3 and 4, the lower jaws 53ª being mounted upon slides 54ª, vertically movable in the bases 5 and 5ª. The upper and lower jaws 52 and 53ª are provided with adjusting screws 55 by means of which the slides 54 and 54ª may be moved toward or from the intermediate jaws 52ª and 53. The outer ends of rails 43ᵇ and 47ª are attached to hopper 46 and their inner ends are pivotally connected by pins 56 and 56ª to the jaws 52ª and 53ª so that as these heads are moved vertically, a corresponding movement will be imparted to the rails and their upper edges will, therefore, be always in alignment with the upper surfaces of the jaws, regardless of the different vertical adjustments of these jaws. Thus, the smooth unobstructed feeding of the jambs will not in any way be interrupted by the change of position of the clamping jaws. The jaws 52ª and 53 are mounted upon slides 57 having a guiding means comprising slots 58 and bolts 59, and adjusting screws 60 are provided having heads 61 provided with sockets 62 to receive a suitable tool by means of which the adjusting screws may be revolved and the clamping jaws 52ª and 53 moved vertically toward or from the complementary heads 52 and 53ª to increase or decrease the distance between them and accommodate the machine for jambs of different thickness, the adjustment of the heads being such that the jambs will slide between them during the feeding operation and be held during the cutting operation to insure the uniform and regular formation of the dado or groove in each jamb.

*Dado-cutting mechanism.*

Figure 8:
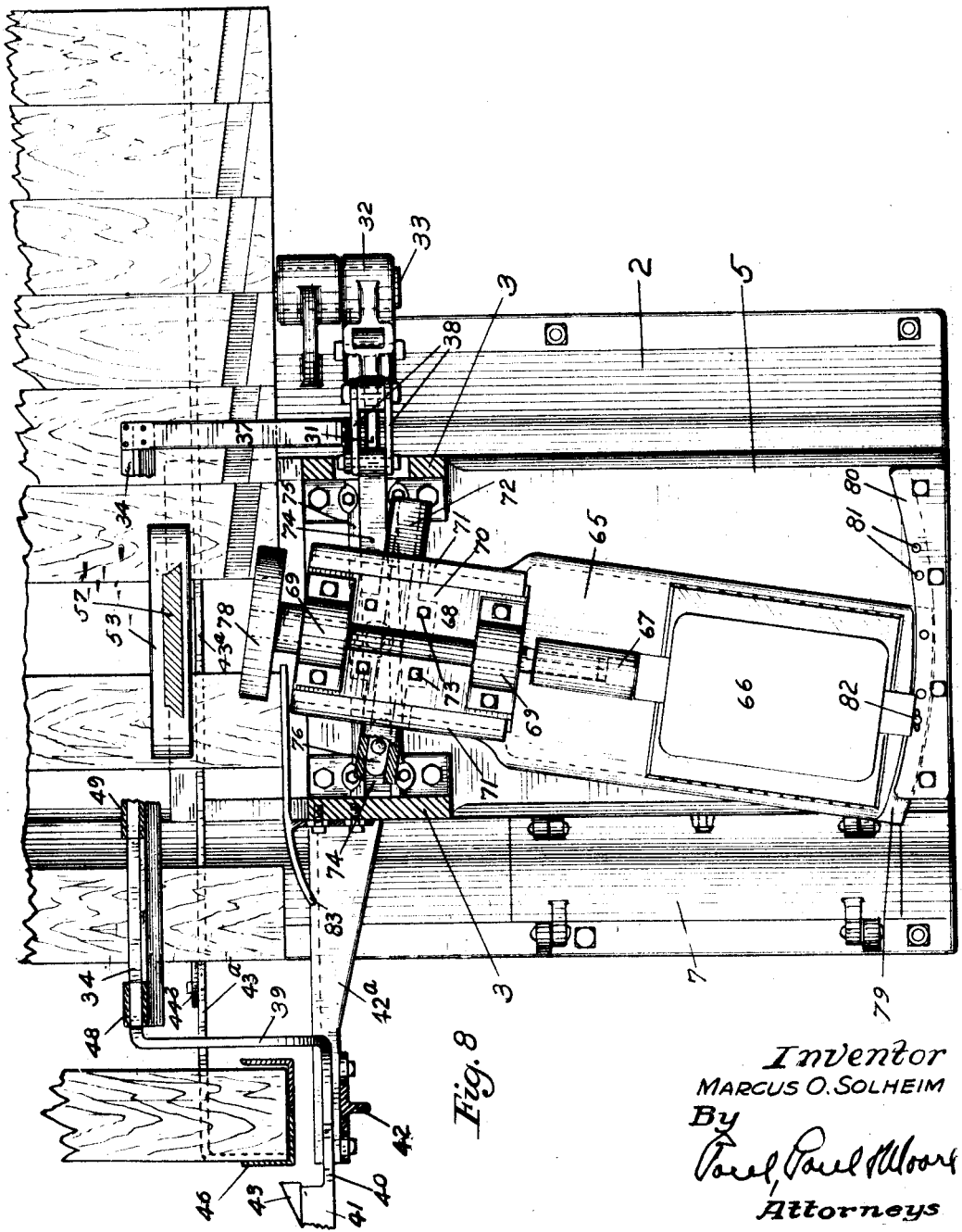
Figure 8 is a sectional plan taken on section line 8—8 of Figure 4.
Figure 9:
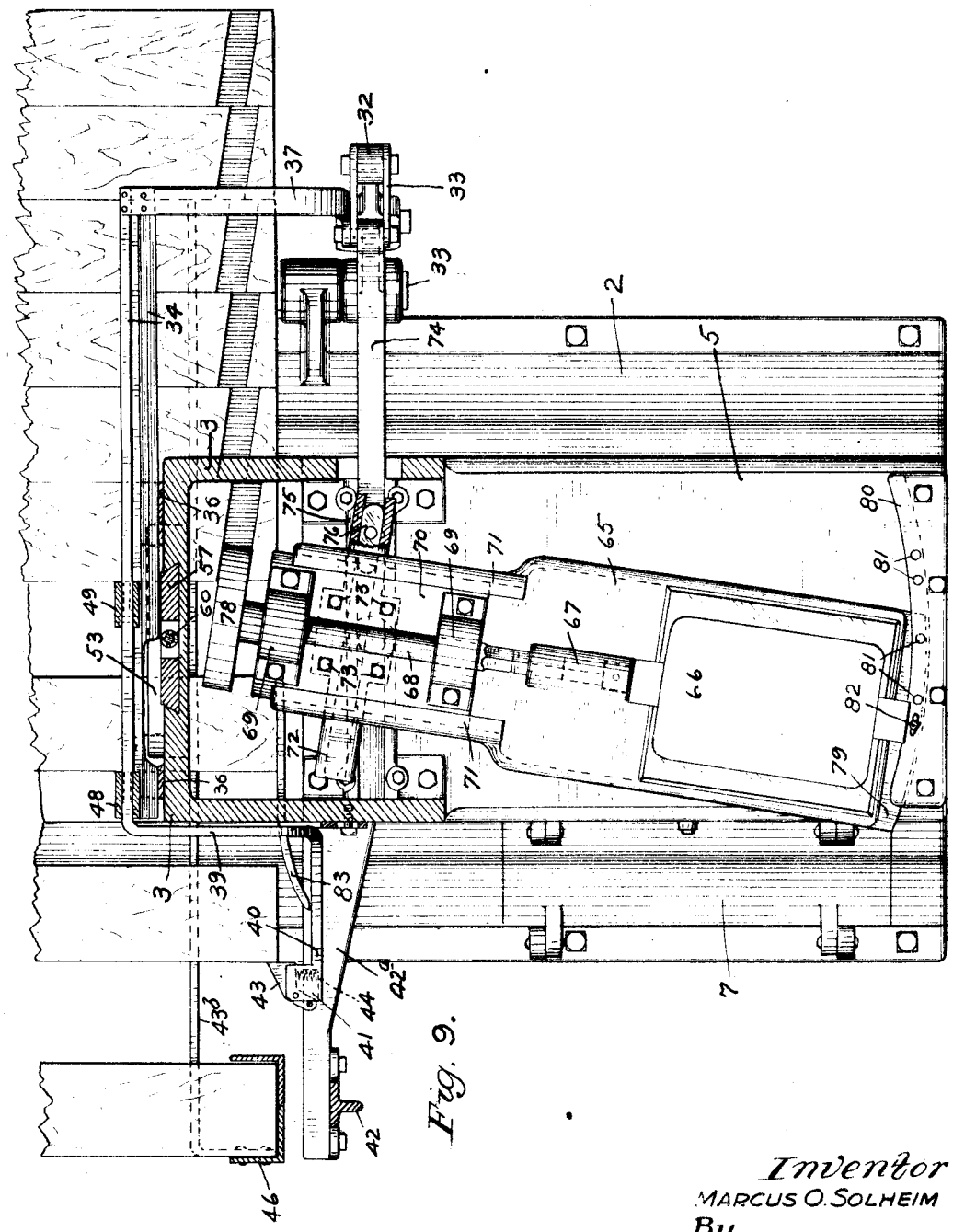
Figure 9 is a view corresponding to Figure 8 showing the cutter head projected on its axis from the position indicated in Figure 8.

Upon the movable base 5ª is a motor 63 on the shaft of which a cutting head 64 is mounted operating between the pairs of jambs for making a straight cut across the jambs to receive the ends of the head jamb of the window or door frame. At the opposite end of the machine, provision is made for cutting the groove or dado obliquely or on a bias to adapt the jambs for receiving the ends of the window or door sill; the degree of the angle or bias of the cut depending of course upon the desired pitch of the sill. 65 represents a carrier plate. A motor 66 is mounted on this plate and has a shaft provided with a socket 67. An arbor 68 is mounted in bearings 69 on a slide 70 that is movable in guides 71 on the plate 65 and the arbor has an end rectangular in cross section adapted to fit and slide in the socket 67, the operation of the motor revolving the arbor 68 and its connection with the motor shaft allowing the arbor freedom of longitudinal movement in the socket 67. A channel bar 72 is secured to the under side of the slide 70 by suitable means such as bolts 73 and a sliding bar 74 is mounted in a channel 75 transversely of the plate 65 and its supporting bracket and has a pivoted guide block 76 fitting the channel 72 and slidable therein. The plate 65 is pivoted to the base 5 by a pin 77, to allow horizontal oscillation of the plate and the adjustment of the arbor 68 and the dadoing head 78 thereon at the desired angle to the work. A flange 79 is provided at the outer end of the plate 65 movable under a curved guide 80 in which holes 81 are formed adapted to register with a hole in the flange 79 to receive a pin 82 by means of which the operator can adjust the plate 65 at the desired angle to the work. The slide 74 is connected to the links 38 so that movement of the levers 32 will reciprocate the bars 34 and 35 and 74 simultaneously and the connection of the bar 74 with the slide 70 as described will move the slide lengthwise in its guides and feed the dadoing cutter at the desired angle. If the pin 82 is placed in the center hole of the guide, then the plate 65 will be in alignment with the jambs and the dadoing cutter will make a straight cut across the jambs, but when the plate 65 is swung to the positions shown in Figures 8 and 9, then the dadoing cutter will make an oblique cut in the jambs and the feed mechanism including the bar 74 and its connections will perform their functions and feed the slide 70 so that the cutter head will form a groove of the desired angle.

The rails 43ᵇ have extensions 43ᶜ which extend upwardly and outwardly from the machine to form supports over which the lower jambs are moved when the dadoing operation has been performed. The extensions of the rails 43ᶜ near the machine are upwardly inclined for a certain distance and then project out horizontally and the rails 47ª have downwardly inclined extensions 47ᵇ over which the jambs are moved, the travel of the jambs being so timed that the upper series will be fed over the rails 47ᵇ and deposited upon the jambs of the lower series, with one jamb of a pair resting upon and coinciding with the other jamb of the same pair so that in each pair, there will be a right and left hand jamb or a complete set for each window or door frame. The pairs of jambs or one set for each frame will thereby be kept together and be removed from the horizontal extensions of the rails 43ᵇ manually or by a suitable mechanical means as may be preferred. The upper group of jambs preferably pass under spring fingers 47ᶜ which have frictional contact with the upper surfaces of the jambs and hold them in place on the rails 47ᵇ preventing them from sliding prematurely, the jambs being retarded sufficiently so that the forward one will be deposited upon the other jamb of the pair beneath it at just the proper time to insure the accurate register of the upper with the lower jamb.

The ends of the hoppers 46 and 47 on the right hand side of the machine are so arranged in relation to the cutting head 78 that when the jambs are pushed out of the hoppers onto the rails 43ᵇ and 47ᵃ, there will be an excess of stock at the ends of the jambs for cutting the diagonal or oblique dadoes or grooves therein. This adjustment of the hopper ends allows for the necessary clearance of the jambs and I prefer to provide upper and lower adjustable guides 83 and 84 at one end of the hoppers so that as a jamb is fed toward the cutting heads, the ends of the jamb will come in contact with the curved surfaces of the guides and the jamb will assume its proper position with respect to the cutting head 78 before it reaches the adjustable jaws and will be held by these jaws against premature movement laterally as it is fed to the cutting head.

The operation of the machine is as follows:

The hoppers 46 and 47 are filled with window or door jambs, rights and lefts, the movable housing being first adjusted on the base to accommodate the machine to the length of the jambs. The operator, preparatory to starting the machine, will place a jamb on the lower rails 43ᵇ beneath the jambs in the hopper 47 above. This is to insure the proper feeding of the jambs to the cutting heads, that is so that a right and a left hand jamb will be engaged by the cutting heads at the same time. The reciprocating bars will feed the pairs of jambs horizontally across the machine and between the clamping jaws where the jambs will be held with sufficient pressure to prevent lateral movement during the dado-cutting operation. The pressure of the succeeding jambs will force those ahead through the machine and as they pass out on the discharge side, the right and left hand jambs will be assembled one upon another, as previously described, and will be kept in pairs for future handling. The head for cutting the diagonal dado is adjusted by the oscillation of the carrier 65 to obtain the desired angle of cut in the jamb that is necessary for it to receive the end of the window or door sill. As the cutting head moves through the surface of the jambs, it will be adjusted axially to accommodate itself to the degree of divergence of the groove or dado from the plane of the end of the jamb. I am thus able to cut the dadoes in the opposite ends of the jamb simultaneously and thereby I am able to form the dadoes or grooves accurately with the same pitch or degree of divergence from the plane of the ends of the jambs and thereby insure the accurate fitting of the ends of the sill to the jambs, and by the adjustment of the clamping jaws the distance between them may be varied according to the thickness of the stock of which the jambs are composed.

I claim as my invention:

1. In a dadoing machine, a pair of hoppers arranged one in advance of the other upon different levels and each adapted to receive a pile of window or door jambs placed one upon the other therein, one hopper containing right hand jambs and the other left hand jambs, means for simultaneously feeding the lower jambs horizontally from the pile in each hopper, and dado-cutting heads operating between the upper and lower jambs for simultaneously cutting transverse grooves therein.

2. In a dadoing machine, a pair of hoppers arranged one in advance of the other upon different levels, and each adapted to receive a pile of window or door jambs placed one upon the other therein, one hopper receiving the right hand jambs and the other the left hand jambs, one end of each hopper being adapted for adjustment to adapt them for jambs of different length, means operating between said hoppers for engaging and feeding the lower jamb in each pile horizontally and dado-cutting heads operating between the moving jambs for simultaneously cutting transverse grooves in the opposite faces of each pair of jambs simultaneously.

3. In a dadoing machine, a pair of hoppers adapted to receive respectively right and left hand window or door jambs placed one upon the other in said hoppers, means for feeding said right and left hand jambs from the bottom of each pile, and dado-cutting heads operating to transversely groove the opposite faces of each pair of jambs simultaneously as the pairs are fed successively to said cutting heads.

4. In a jamb dadoing machine, a pair of hoppers mounted upon different levels and adapted to receive respectively right and left hand jambs placed one upon the other therein, rails whereon the lower jambs are fed from said hoppers, means for engaging the lower jamb in each hopper to push it horizontally therefrom, a jamb from the lower hopper being placed manually opposite the jambs of the upper hopper before starting the machine, means for ejecting the succeeding jamb of the lower hopper therefrom simultaneously with the feed of the pair of jams to the machine, and means for cutting grooves transversely in the opposing faces of said jambs.

5. In a jamb dadoing machine, a pair of hoppers mounted upon different levels and adapted to receive respectively right and left hand jambs placed one upon the other therein, rails whereon the lower jambs are fed from said hoppers, reciprocating bars arranged in pairs intermediate to said hoppers and having means for engaging the lower jamb in each hopper to push it horizontally therefrom, a jamb from the lower hopper being placed manually opposite the jambs of the upper hopper before starting the machine, means for ejecting the succeeding jamb of the lower hopper therefrom simultaneously with the feed of the pair of jambs to the machine, and means for cutting grooves transversely in the opposing faces of said jambs.

6. In a dadoing machine, upper and lower horizontal rails, a pair of hoppers positioned one in front of the other and adapted to receive respectively a pile of right and left hand window or door jambs placed one upon the other therein, said rails supporting the piles of jambs and over which the jambs are fed to the machine, reciprocating bars having means for feeding the jambs edgewise on said rails to the machine, and cutting heads operating between each pair of opposite jambs for cutting grooves in their opposing faces.

7. In a dadoing machine, means for slidingly feeding pairs of jambs edgewise simultaneously and in superposed spaced relation, means for cutting grooves straight across said jambs at one end thereof, and means for cutting grooves diagonally or obliquely in the opposing faces of the other ends of the pairs of jambs.

8. In a dadoing machine, rails upon different levels whereon right and left hand jambs are placed to be fed edgewise in pairs, jaws arranged in pairs and adjustable for varying the distance between the jaws of each pair to adapt them for jambs of different thickness, said rails having a pivotal connection with two of said jaws for adjustment vertically therewith, means for feeding the jambs in pairs, and means for grooving transversely the opposing surfaces of each pair.

9. In a dadoing machine, guide rails whereon window and door frame jambs are placed in pairs, each pair comprising a right and left hand jamb, means for moving each pair of jambs edgewise on said guide rails, jaws arranged in pairs between which the jambs are fed, means for adjusting the jaws of each pair to increase or decrease the distance between the opposing heads to adapt them for jambs of different thickness, and means operating between the jambs of each pair for cutting grooves transversely in the opposing faces thereof.

10. In a dadoing machine, means for separately feeding right and left hand jambs in pairs, with the members of each pair disposed one above the other, a groove cutting head mounted between the upper and lower jamb of each pair for cutting dadoes transversely therein as the jambs are fed, and means for feeding said cutting head axially.

11. In a dadoing machine, means for separately slidingly feeding right and left hand jambs in pairs upon different levels horizontally, a groove-cutting head adapted to cut a groove or dado diagonally through the surface of the jambs as they are fed, said head having an axial movement and mounted for adjustment on a vertical axis to vary its angle to the work.

12. In a dadoing machine, means for supporting and slidingly feeding window or door jambs in pairs, in opposing spaced relation, and a dado-cutting head mounted between the jambs to simultaneously cut a dado or groove in the opposing faces of the jambs of the same pair.

13. In a dadoing machine, horizontal supports whereon window and door frame jambs are adapted to slide in pairs, each pair arranged in groups upon different levels, means for slidingly feeding the groups of jambs comprising the different pairs horizontally and edgewise through the machine, and means operating between the jamb supports for cutting diagonal grooves or dadoes transversely in the opposing faces of each pair of jambs.

14. In a dadoing machine, suitable supports whereon window and door frame jambs are placed horizontally in pairs, each pair comprising a right and left hand jamb, clamping jaws arranged in pairs upon different levels between which the groups of jambs are fed horizontally, said jamb supports and said jaws being adapted for simultaneous vertical adjustment to provide unobstructed passage for the jambs between said jaws and dado-cutting means mounted between the groups of jambs to engage the opposing surfaces of the jambs of each pair simultaneously for cutting grooves diagonally therein.

15. In a dadoing machine, means for slidingly feeding right and left hand jambs separately in pairs upon different levels horizontally, a groove-cutting head adapted to cut a groove or dado diagonally through the opposing faces of the jambs as they are fed, a slide whereon said cutting head is mounted for axial movement, and mechanism for simultaneously feeding the jambs edgewise and moving said cutting head axially.

16. In a jamb dadoing machine, a pair of hoppers mounted upon different levels, and adapted to receive respectively right and left hand jambs placed one upon the other therein, guide rails whereon the lower jambs are fed edgewise to the machine, means for ejecting and feeding the jambs in pairs from said hoppers, means for cutting grooves transversely in the opposing faces of the pairs of jambs, and means for adjusting said hoppers and the supports therefor to adapt them for jambs of different length.

17. In a jamb dadoing machine, a base, housings mounted thereon and relatively adjustable on said base, hoppers arranged upon different levels and adapted to receive respectively right and left hand jambs piled one above another therein, rails extending transversely of said base between said housings, bars reciprocating lengthwise of said rails and having means for engaging respectively the lower jamb in each hopper and ejecting it edgewise therefrom upon said rails, a rock shaft mounted on said base, levers mounted on said rock shaft and pivotally connected with said bars, means for rocking said shaft and levers, and dado-cutting heads mounted in said housings between the jambs of each pair for cutting dadoes transversely therein.

18. In a jamb dadoing machine, a pair of hoppers mounted upon different levels and adapted to receive respectively right and left hand jambs placed one upon the other therein, means for adjusting and feeding the jambs in pairs from said hoppers, means for cutting grooves transversely in the opposing faces of the pairs of jambs, said cutting means operating between the jambs upon different levels, one of said cutting means being adapted to cut dadoes or grooves obliquely in the opposite faces of the jambs, and adjustably mounted guides positioned to engage one end of the jambs to position them with respect to said oblique groove cutting means.

19. In a dadoing machine, a pair of hoppers arranged one in advance of the other and at different levels, and adapted to receive piles of jambs, means for slidingly feeding the lower jamb of each pile horizontally and a dado cutting head operating between the upper and lower jambs for simultaneously cutting transverse grooves therein.

20. In a dadoing machine means for guiding and maintaining pieces of stock in superposed spaced pairs, the guides acting at two points respectively adjacent the ends of the stock, cutters arranged to operate at the outer side of the guiding means, and means for feeding superposed pieces of jamb stock through the guides.

21. In a dadoing machine means for guiding and maintaining pieces of stock, in superposed spaced pairs, the guides acting at two points respectively adjacent the ends of the stock, cutters arranged to operate at the outer side of the guiding means, means for feeding superposed pieces of jamb stock through the guides, and means for causing the upper member of each pair to be deposited upon the lower, after the cutting operation.

In witness whereof, I have hereunto set my hand this 4th day of May, 1926.

MARCUS O. SOLHEIM.

CERTIFICATE OF CORRECTION.

Patent No. 1,658,260.             Granted February 7, 1928, to

MARCUS O. SOLHEIM.

It is hereby certified that the name of the assignee in the above numbered patent was erroneously written and printed as "Anderson Lumber Company, of Bayport, Minnesota", a Corporation of Wisconsin whereas said name should have been written and printed as "Andersen Lumber Company, of Bayport, Minnesota", a Corporation of Wisconsin, as shown by the records of assignments in this office; and that the said Letters Patent should be read with this correction therein that the same may conform to the record of the case in the Patent Office.

Signed and sealed this 6th day of March, A. D. 1928.

Seal.

M. J. Moore,
Acting Commissioner of Patents.